United States Patent
Chen et al.

(10) Patent No.: US 12,534,154 B2
(45) Date of Patent: Jan. 27, 2026

(54) EARLY WARNING METHOD, APPARATUS AND DEVICE FOR TUMBLING DURING RIDING

(71) Applicant: Shenzhen Ziwu Chuangxin Technology Co., Ltd., Shenzhen (CN)

(72) Inventors: Wenyue Chen, Shenzhen (CN); Zhaolin Li, Shenzhen (CN); Yuqun Cai, Shenzhen (CN)

(73) Assignee: Shenzhen Ziwu Chuangxin Technology Co., Ltd., Shenzhen (CN)

( * ) Notice: Subject to any disclaimer, the term of this patent is extended or adjusted under 35 U.S.C. 154(b) by 71 days.

(21) Appl. No.: 18/739,293

(22) Filed: Jun. 10, 2024

(65) Prior Publication Data
US 2025/0360983 A1    Nov. 27, 2025

(30) Foreign Application Priority Data
May 24, 2024    (CN) .......................... 202410654263.8

(51) Int. Cl.
*B62J 50/21*    (2020.01)
*G01P 15/16*    (2013.01)

(52) U.S. Cl.
CPC .............. *B62J 50/21* (2020.02); *G01P 15/16* (2013.01)

(58) Field of Classification Search
CPC ................................. B62J 50/21; G01P 15/16
See application file for complete search history.

(56) References Cited

U.S. PATENT DOCUMENTS

| | | | | |
|---|---|---|---|---|
| 6,587,042 B2 * | 7/2003 | Tabata | ................. | G08B 25/016 340/432 |
| 2014/0276238 A1 * | 9/2014 | Osorio | ............... | G08B 21/0446 600/595 |
| 2024/0075801 A1 * | 3/2024 | Kugler | ................. | B62D 21/183 |

* cited by examiner

*Primary Examiner* — Omeed Alizada
(74) *Attorney, Agent, or Firm* — Hawaii Patent Services; Nathaniel K. Fedde; Kenton N. Fedde

(57) ABSTRACT

An early warning method for tumbling during riding, comprising: conducting riding monitoring to a target rider, and obtaining a first riding velocity, conducting riding monitoring to the target rider, and obtaining a second riding velocity and acceleration data; where the communication status of the GNSS positioning module is regular, monitoring the first riding velocity; where the acceleration data satisfy an interval of a first threshold, giving threshold analysis for the first riding velocity and giving riding gesture analysis to the target rider and obtaining riding gesture information; where the first riding velocity satisfy an interval of a second threshold, and the riding gesture data show irregular riding gestures, pronouncing a warning to the target rider, collecting operation data of the target rider, where the operation data of the target rider are not collected, sending assistance request data, and sending the assistance request data to riders in a target area.

9 Claims, 2 Drawing Sheets

EARLY WARNING METHOD, APPARATUS AND DEVICE FOR TUMBLING DURING RIDING

INCORPORATION BY REFERENCE

This application claims the benefit of priority from China Patent Application No. 2024106542638 filed on May 24, 2024, the contents of which are hereby incorporated by reference in their entirety.

TECHNICAL FIELD

The present invention relates to the technical field of early warning and monitoring, especially an early warning method, apparatus and device for tumbling during riding.

BACKGROUND TECHNOLOGY

In recent years, cycling is more and more popular; and accidents due to tumbling are increasing annually. After tumbling, a rider may be restricted in movements or be conscienceless, cannot contact for help independently, the optimum medical assistance time may be missed. Some riding devices (motorbikes and helmets) can judge whether the rider falls over by monitoring collision with acceleration sensors, and send information to request help with positional information via mobile terminals.

In the prior art, whether the rider falls over is judged with the acceleration sensors, with only one judgment condition, when some riders ride in a team, where one of the riders falls over, warning cannot be sent to other riders in the team in time, and information to request help can only be sent via the mobile terminals, when the mobile terminals are disconnected, the information to request help cannot be sent.

SUMMARY OF INVENTION

The present invention provides an early warning method, apparatus and device for tumbling during riding to improve timeliness and accuracy of early warning of tumbling during riding.

On a first aspect, the present invention provides an early warning method for tumbling during riding, wherein the early warning method for tumbling during riding comprises:

S1: conducting riding monitoring to a target rider at a preset frequency via a GNSS positioning module, and obtaining a first riding velocity, meanwhile, conducting riding monitoring to the target rider at the preset frequency via a six-axis inertial measurement unit module, and obtaining a second riding velocity and acceleration data;

S2: monitoring in real time a communication status of the GNSS positioning module, where the communication status of the GNSS positioning module is regular, monitoring in real time the first riding velocity;

S3: analyzing the acceleration data, extracting the acceleration data corresponding to the first riding velocity, and where the acceleration data satisfy an interval of a first threshold, executing step S4; where the acceleration data do not satisfy the interval of the first threshold, executing repeatedly steps S1 to S3;

S4: giving threshold analysis for the first riding velocity in a preset time interval, meanwhile, giving riding gesture analysis to the target rider and obtaining riding gesture information, where the first riding velocity satisfy an interval of a second threshold, and the riding gesture data show irregular riding gestures, pronouncing a warning to the target rider, meanwhile, collecting in real time operation data of the target rider, where the first riding velocity does not satisfy the interval of the second threshold, or the riding gesture data are regular, executing steps S1 to S4 repeatedly; and S5: where the operation data of the target rider are not collected, sending assistance request data to a preset remote server, and sending the assistance request data to a plurality of riders in a target area via a Mesh network, wherein the assistance request data comprise positional information of the target rider.

In conjunction with the first aspect, in a first embodiment of the first aspect of the present invention, the method further comprises:

Where the communication status of the GNSS positioning module is irregular, monitoring in real time the second riding velocity;

Analyzing the acceleration data, where the acceleration data satisfy the interval of the first threshold, executing the step S4, where the acceleration data do not satisfy the interval of the first threshold, repeatedly executing the steps S1 to S3;

Giving threshold analysis to the second riding velocity in the preset time interval, meanwhile, giving riding gesture analysis to the target rider, and obtaining the riding gesture data, where the second riding velocity satisfies the interval of the preset second threshold, and the riding gesture data show an irregular riding gesture, pronouncing a warning to the target rider via a loudspeaker module, meanwhile, collecting in real time the operation data of the target rider, where the first riding velocity does not satisfy the interval of the preset second threshold or the riding gesture data are regular, executing repeatedly the steps S1 to S4;

Where the operation data of the target rider are not collected, sending assistance request data to the preset remote server, wherein the assistance request information comprises the positional information of the target rider and pronouncing the assistance request data to the plurality of riders in the target area via the preset Mesh network.

In conjunction with the first aspect, in a second embodiment of the first aspect of the present invention, the step S4 comprises:

Giving threshold analysis to the first riding velocity in the preset time interval, meanwhile, giving riding gesture analysis to the target rider, and obtaining the riding gesture data, where the first riding velocity satisfies the interval of the preset second interval, extracting forward inclination angle data, backward inclination angle data and left or right inclination angle data of the target rider collected by the six-axis inertial measurement unit module;

Giving riding gesture analysis to the target rider according to the forward inclination angle data, the backward inclination angle data and the left or right inclination angle data, and obtaining the riding gesture data, where the riding gesture data show the irregular riding gesture, pronouncing a warning to the target rider via the loudspeaker module, meanwhile, collecting in real time the operation data of the target rider, where the first riding velocity does not satisfy the interval of the preset second threshold or the riding gesture data are regular, executing the steps S1 to S4 repeatedly.

In conjunction with the first aspect, in a third embodiment of the first aspect of the present invention, giving riding gesture analysis to the target rider according to the forward inclination angle data, the backward inclination angle data and the left or right inclination angle data and obtaining the riding gesture data comprises:

Analyzing the left or right inclination angle data, the backward inclination angle data and the forward inclination angle data, judging the riding gesture data show irregular riding gestures, comprises: the left or right inclination angle data exceed a first preset angle threshold, the forward inclination angle data exceed a second preset angle threshold, and/or the backward inclination angle data exceed a third preset angle threshold.

In conjunction with the third aspect, in a fourth embodiment of the first aspect of the present invention, the method further comprises: where the riding gesture data show the regular riding gesture and the first riding velocity satisfies the interval of the preset second threshold, executing the steps S1 to S4 repeatedly.

In conjunction with the first aspect, in a fifth embodiment of the first aspect of the present invention, the method further comprises:

Upon collecting of the operation data of the target rider, executing the steps S1 to S5 repeatedly.

In conjunction with the first aspect, in a sixth embodiment of the first aspect of the present invention, the step S5 further comprising:

Where the operation data of the target rider are not collected, sending assistance request data to the preset remote server, wherein sending the assistance request data to the preset remote server is done in a following manner:

Connecting directly with the remote server via a preset WiFi module by a WiFi hotspot, and sending the assistance request data to the remote server, or Connecting with a mobile application on a telephone via a preset Bluetooth module, and connecting with the remote server via the mobile application and sending the assistance request data to the remote server, wherein the assistance request data comprise the positional information of the target rider and pronouncing the assistance request data to the plurality of riders in the target area via the preset Mesh network.

On a second aspect, the present invention provides an early warning apparatus for tumbling during riding, the early warning apparatus for tumbling during riding comprises:

An acquisition module, configured to monitor a target rider during riding at a preset frequency via a GNSS positioning module, and obtaining a first riding velocity, meanwhile, monitoring the target rider at the preset frequency during riding via a six-axis inertial measurement unit module and obtaining a second riding velocity and acceleration data;

A monitoring module, configured to monitor a communication status of the GNSS positioning module, and monitoring in real time the first riding velocity where the communication status of the GNSS positioning module is regular;

A computation module, configured to analyze the acceleration data, where the acceleration data satisfy an interval of a preset first threshold, executing the step S4, where the acceleration data do not satisfy the interval of the preset first threshold, executing the steps S1 to S3 repeatedly;

A broadcasting module, configured to give threshold analysis to the first riding velocity in a preset time interval, meanwhile, giving riding gesture analysis to the target rider, and obtaining the riding gesture data, where the first riding velocity satisfies an interval of a preset second threshold, pronouncing a warning to the target rider via a loudspeaker module, meanwhile, collecting in real time operation data of the target rider, where the first riding velocity does not satisfy the preset second threshold interval, or the riding gesture data are regular, executing the steps S1 to S4 repeatedly; and An early warning module, configured to send assistance request data to a preset remote server where the operation data of the target rider are not collected, and send the assistance request data to a plurality of riders in a target area via a Mesh network, wherein the assistance request data comprise positional information of the target rider.

On a third aspect, the present invention provides an early warning device for tumbling during riding, comprising a memory and at least one processor, instructions are stored in the memory; the at least one processor calls the instructions in the memory to have the early warning device for tumbling during riding to execute the early warning method for tumbling during riding.

In the technical solutions provided in the present invention, by monitoring changes of riding velocities and riding gestures of a rider whether the rider falls over is comprehensively judged and detection accuracy is promised. Before sending the assistance request information, by pronouncing the warning the current rider is informed and the other riders in the team are reminded, the current rider can cancel broadcasting and warning. By sending the assistance request information in a plurality of manners such as telephones, WiFi and Mesh, riding conditions of the rider can be monitored in view of data from GNSS and six-axis inertial measurement unit module to know whether the rider falls over more efficiently and accurately, where tumbling of the rider is detected, the rider is warned and the other riders in the team are reminded timely, where the warning is not cancelled, the assistance request information will be sent via telephones, WiFi and Mesh, timeliness and accuracy of early warning for tumbling during riding is improved.

BRIEF DESCRIPTION OF DRAWINGS

To explain the technical solutions in the present invention to a better extent, hereinafter a brief introduction will be given to drawings to be used in the description of embodiments of the present invention, apparently, the drawings in the following description show only some embodiments of the present invention and for those of ordinary skill in the art, without paying creative effort, other drawings can be obtained based on these drawings.

EMBODIMENTS

Embodiments of the present invention provide an early warning method, apparatus and device for tumbling during riding. Terms "first", "second", "third", "fourth" (if any) etc. in the specification, claims and drawings of the present invention are employed to differentiate similar objects, rather than describe specific orders or sequences. It shall be understood that, the data used in such conditions can be mutually replaced in appropriate cases so as to have the embodiments given here to be implemented in orders other than those shown or described herein. Besides, terms "comprising", "having" or any variants therefore intend to cover non-exclusive inclusion, for example, a process, method, system, product or apparatus comprising a series of steps or units is not necessarily limited to the steps or units clearly listed herein, instead, it also covers other steps or units not explicitly listed herein or inherent to the process, method, product or apparatus.

Figure 1:
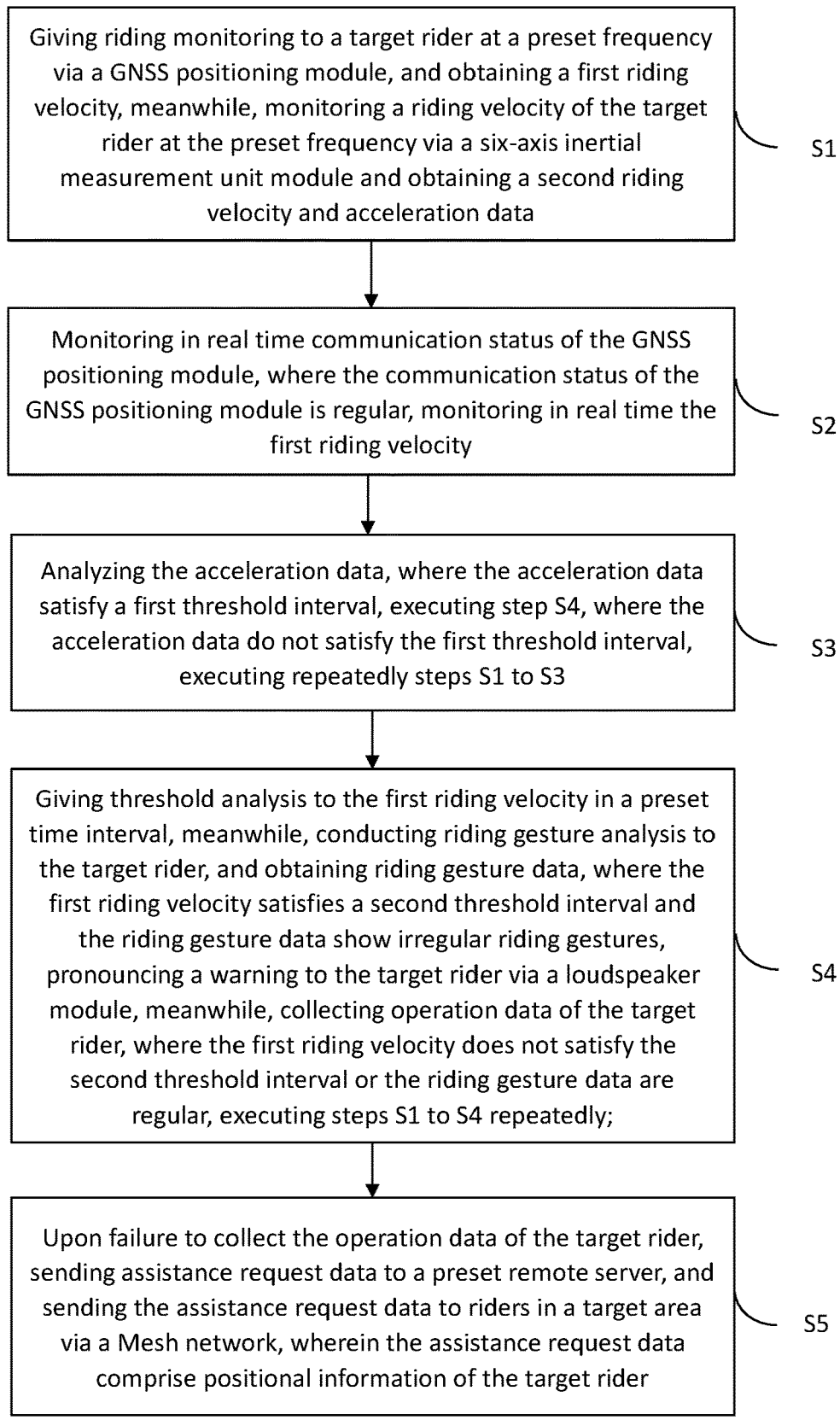
FIG. 1 is a schematic diagram showing an embodiment of an early warning method for tumbling during riding in an embodiment of the present invention.

To ease understanding, hereinafter a description is given to specific processes of embodiments of the present invention, with reference to FIG. 1, an embodiment of the early warning method for tumbling during riding comprises:

S1: conducting riding monitoring to a target rider at a preset frequency via a GNSS positioning module, obtaining a first riding velocity, meanwhile, conducting riding monitoring to the target rider at the preset frequency via a six-axis inertial measurement unit module, and obtaining a second riding velocity and acceleration data;

S2: monitoring a communication status of the GNSS positioning module in real time, where the communication status of the GNSS positioning module is regular, monitoring in real time the first riding velocity;

S3: analyzing the acceleration data, where the acceleration data satisfy a preset first threshold interval, executing a step S4, where the acceleration data do not satisfy the preset first threshold interval, executing the steps S1 to S4 repeatedly;

In the present step, the first threshold interval is 1.3 g-2 g, where g is an acceleration unit, specifically 9.8 m/s$^2$.

S4: giving threshold analysis to the first riding velocity in a preset time interval, meanwhile, giving riding gesture analysis to the target rider, and obtaining riding gesture data, where the first riding velocity satisfies a preset second threshold interval and the riding gesture data show irregular riding gestures, pronouncing an alert to the target rider via a loudspeaker module, meanwhile, collecting in real time operation data of the target rider, where the first riding velocity does not satisfy the preset second threshold interval or the riding gesture data are regular, executing the steps S1 to S4 repeatedly;

In the present step, the preset time interval is 2 s-6 s.

S5: where the operation data of the target rider are not collected, sending assistance request data to a preset remote server, and sending assistance request data to a plurality of riders in a target area via a Mesh network, where the assistance request data comprise positional information of the target rider.

It shall be understandable that, an executing party of the present invention can be the early warning apparatus for tumbling during riding, or a terminal or a server, which is not limited herein. In the embodiments of the present invention, the description is given based on using the server as the executing party.

In the present embodiment, it shall be noted that, during riding monitoring of the target rider at the preset frequency and obtaining the first riding velocity, the preset frequency is 1 Hz-10 Hz. The primary step is to monitor the first riding velocity of the target rider via the GNSS positioning module, and meanwhile, another set of riding data are collected at the same preset frequency by the six-axis inertial measurement unit module, and the riding data comprise the second riding velocity and acceleration data. The two velocity measurement systems play as back-ups of each other, and in this way, velocity monitoring continuity and accuracy can be promised. Suppose in an open environment, a rider is conducting daily training, the GNSS module will track and determine the riding path of the rider, meanwhile, the six-axis inertial measurement unit module serves to assist in providing the velocity and gesture data to improve robustness of the system.

Wherein the communication status of the GNSS positioning module is monitored in real time. Where the communication is normal, the first riding velocity is monitored in real time to know whether sports status of the rider is stable. Where the GNSS communication status is irregular, the second riding velocity will be automatically converted to be the main source of velocity monitoring. For example, when the weather is good and communication conditions are fine, the GNSS data will serve the main source of velocity monitoring, and the second riding velocity will be used for auxiliary verification. Further, when the velocity of the rider enters a preset velocity interval, the role of the six-axis inertial measurement unit module will be very important, it will calculate the current gesture, obtain vital gesture data such as pitch attitudes, bank angles and yaw angles. Suppose the rider accelerates during riding down a slope, at this time, the six-axis inertial measurement unit module will monitor minor changes of gestures of the rider closely to judge whether the rider is in danger. Where the gesture data of the rider are monitored to be irregular, for example, in case of abrupt pitch attitude or bank angle increase, ongoing or possible tumbling accidents may be deemed to occur, an alarming is pronounced via the loudspeaker module to remind the rider to take necessary measures immediately.

Where emergency alarming is triggered, and not any operation data of the rider have been observed, this may mean that, the rider cannot control development of the accident independently, or may lose conscience or be inactive due to tumbling. In such case, the preset WiFi module will immediately send assistance request data to the remote server, and send assistance request data to other riders in the target area, and upon action, the rescue is triggered. In the meanwhile, the assistance request data are broadcast in real time in the Mesh network module, so as to cover areas not covered by WiFi and ensure that even in case of unstable network environments, the assistance request information can be delivered accurately.

Suppose a rider is training along a mountainous riding path, where an abrupt change of velocity and irregular gesture of the rider is detected during riding down along a steep slope, the loudspeaker will send immediately an alarming. Where the rider cannot react timely due to being frightened, technical mistakes or any other reason, and not any operation data is detected, assistance request programs will be rapidly initiated to inquire riders nearby and remote rescue teams for help. The rescue signals will be broadcast via the Mesh network, to ensure that even in possible WiFi blind area such as valleys, the rescue request can be received by the rider or rescue team nearby, and they can go to the accident place for rescue as soon as possible.

In an embodiment of the present invention, whether the rider falls over is judged comprehensively by monitoring changes of the velocity and the riding gesture of the rider to improve detection accuracy. Before sending the assistance request information, alarming is sent to inform the current rider and inform the other riders in the team, and the current rider can cancel broadcast and the alarming. By sending the assistance request information by telephones, WiFi and Mesh, riding conditions of the rider can be monitored comprehensively in view of the GNSS and the six-axis inertial measurement unit module, to know more efficiently and accurately whether the rider falls over, and upon detection of tumbling of the rider, the rider is timely warned and the other riders in the team are informed and reminded, when the alarming is not canceled, the assistance request information will be sent via telephones, WiFi and Mesh, to improve timeliness and accuracy of early warning of tumbling during riding.

In an embodiment, the early warning method for tumbling during riding comprises specifically the following steps:
(1) Where the communication status of the GNSS positioning module is irregular, monitoring in real time the second riding velocity;
(2) Analyzing the acceleration data, where the acceleration data satisfy the first threshold interval, executing the step S4, where the acceleration data do not satisfy the first threshold interval, executing the steps S1 to S3 repeatedly;
(3) Giving threshold analysis to the second riding velocity in the preset time interval, in the meanwhile, giving riding gesture analysis to the target rider, and obtaining the riding gesture data, where the second riding velocity satisfies the second threshold interval and the riding gesture data show irregular riding gestures, pronouncing an alarming to the target rider via the loudspeaker module, in the meanwhile, collecting in real time operation data of the target rider, where the first riding velocity does not satisfy the second threshold interval or the riding gesture data are regular, executing the steps S1 to S4 repeatedly; and
(4) Where the operation data of the target rider are not collected, sending assistance request data to a preset remote server, wherein the assistance request data comprise positional data of the target rider, and broadcasting the assistance request data to the riders in the target area via the preset Mesh network.

In an embodiment, executing the step S4 can include specifically the following steps:
(1) Giving threshold analysis to the first riding velocity in the preset time interval, meanwhile, giving riding gesture analysis to the target rider, and obtaining the riding gesture data, where the first riding velocity satisfies the second threshold interval, extracting forward inclination angle data, backward inclination angle data and left or right inclination angle data collected by the six-axis inertial measurement unit module;
(2) Giving riding gesture analysis to the target rider according to the forward inclination angle data, the backward inclination angle data and the left or right inclination angle data, and obtaining the riding gesture data, where the riding gesture data show irregular riding gestures, pronouncing alarming to the target rider via the loudspeaker module, meanwhile, collecting in real time operation data of the target rider, where the first riding velocity does not satisfy the preset second threshold interval or the riding gesture data are regular, executing the steps S1 to S4 repeatedly.

Specifically, with the early warning method for tumbling during riding, upon detection of changes of the first riding velocity to the preset velocity interval, collecting three-axis velocity data for the target rider via the six-axis inertial measurement unit module and obtaining first angular velocity data, second angular velocity data and third angular velocity data. The six-axis inertial measurement unit module is a device combing a three-axis gyroscope and a three-axis accelerometer;

In an embodiment of the present disclosure, the second threshold interval comprises a judgment standard of the first riding velocity, ranging from 0 m/s to 3 m/s. in the meanwhile, to judge whether the rider is riding irregularly, for example, where the forward or backward inclination angles and left or right inclination angles exceed regular ranges, it is judged that the rider is in risk of tumbling. In the foregoing example of riding along a mountainous path, where the bank angle of the rider goes beyond the normal range, it is judged that the rider may tend to tumble, early warning will immediately be started to remind the rider to take measures in time and reduce potential injuries.

In an embodiment, executing the step of giving riding gesture analysis to the target rider according to the forward inclination angle data, the backward inclination angle data and the left or right inclination angle data and obtaining the riding gesture data comprises specifically the following steps:

Analyzing at the same time the left and right inclination angle data, the backward inclination angle data and the forward inclination angle data and judging the riding gesture data comprise irregular riding gestures comprises one or more of: the left or right inclination angle data exceeds a preset first angle threshold, the backward inclination angle data exceeds a preset second angle threshold and the forward inclination angle data exceeds a preset third angle threshold.

It shall be explained that, in a possible embodiment of the present invention, the first angle threshold is 20-45°, the second angle threshold is 10-20° and the third angle threshold is 40-90°.

In an embodiment, the early warning method for tumbling during riding comprising specifically the following steps: where the riding gesture data comprise a regular riding gesture and the first riding velocity satisfies the preset second threshold interval, executing the steps S1 to S4 repeatedly.

In the present embodiment, in the preset time interval, where the riding velocity does not satisfy the threshold of 0 m/s to 3 m/s or the riding gesture is normal, executing the steps S1 to S5 repeatedly.

In an embodiment, the early warning method for tumbling during riding comprises specifically the following steps: after collecting the operation data of the target rider, executing repeatedly the steps S1 to S5.

In an embodiment, executing the step S5 comprises specifically the following steps:
(1) Where the operation data of the target rider have not been collected, sending assistance request data to the preset remote server, where sending the assistance request data to the preset remote server is done in the following manner:
(2) Connecting with the remote server via a preset WiFi module by a WiFi hotspot, and sending the assistance request information to the remote server, or
(3) Connecting a mobile application via a preset Bluetooth module, connecting with the remote server via the mobile application and sending the assistance request data to the remote server, where the assistance request data comprises positional information of the target rider, and broadcasting the assistance request data to a plurality of riders in the target area via a preset Mesh network.

Specifically, upon detection that the target rider cannot conduct regular operation due to factors beyond control, an emergency response mechanism will start sending the assistance request data. Wherein, first of all, upon failure to collect the operation data of the target rider, the WiFi module in the rider device will automatically send the assistance request data to the preset remote server. Upon receipt of such signal, the server will immediately start the rescue, and notify members of the rescue team. The design in this manner works very good for riding along mountainous paths, as in such areas far from cities and with weak signal coverage, timeliness of assistance request is crucial. Identification of riders in the target area is done by analyzing devices identified in the WiFi network, in this way other riders' devices in the target area can be detected and known. When the riders are identified, after obtaining device information of the riders, specific signal communication paths will be provided for the devices. Thereafter, the corresponding signal communication paths will be used to send the assistance request information in voice. To ensure that the assistance request data can be delivered in case of no WiFi signal coverage, the assistance request data are broadcast in real time via the preset Mesh network module. The Mesh network is especially suitable for covering complex terrains and big areas, as the Mesh network is based on multiple hop transmission, even in areas with no direct WiFi connection, the assistance request data can be sent to the riders in the target area via the WiFi module based on the signal transmission paths for the riders by collaboration of the network built in between the devices and the signal transmission paths for the riders, and at the same time, the assistance request data is broadcast via the preset Mesh network module.

Figure 2:
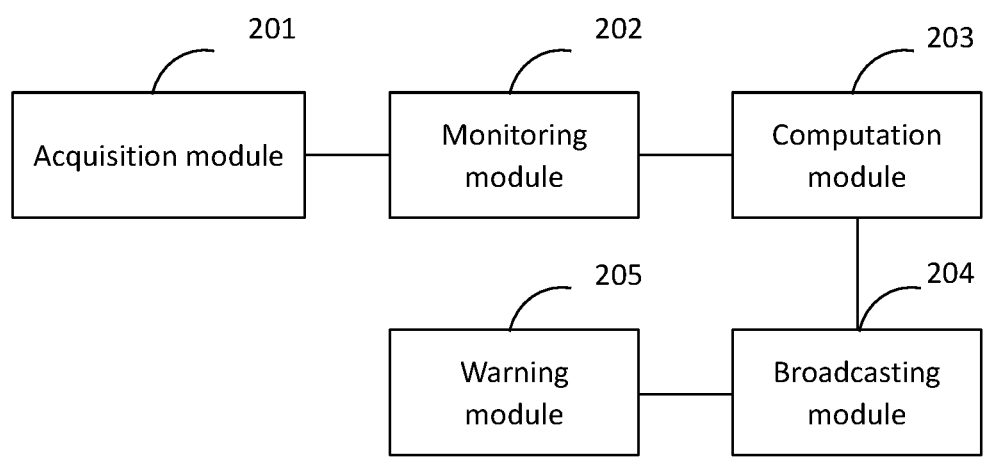
FIG. 2 is a schematic diagram showing an embodiment of an early warning apparatus for tumbling during riding in an embodiment of the present invention.

In the foregoing paragraphs the early warning method for tumbling during riding is set forth, hereinafter a description will be given to an early warning apparatus for tumbling during riding provided in embodiments of the present invention, with reference to FIG. 2, an embodiment of the early warning apparatus for tumbling during riding comprises:

An acquisition module 201, configured to give riding monitoring to the target rider at a preset frequency via a GNSS positioning module, and obtaining a first riding velocity, in the meanwhile, giving riding monitoring to the target rider at the preset frequency via the six-axis inertial measurement unit module and obtaining a second riding velocity and acceleration data;

A monitoring module 202, configured to monitor in real time a communication status of the GNSS positioning module, where the communication status of the GNSS positioning module is regular, monitoring in real time the first riding velocity;

A computation module 203, configured to analyze the acceleration data, where the acceleration data satisfy a first threshold interval, executing the step S4, where the acceleration data do not satisfy the first threshold interval, executing the steps S1 to S3 repeatedly;

A broadcasting module 204, configured to give threshold analysis to the first riding velocity in a preset time interval, in the meanwhile, giving riding gesture analysis to the target rider and obtaining the riding gesture data, where the first riding velocity satisfies a preset second threshold interval and the riding gesture data show irregular riding gestures, pronouncing an alarming to the target rider via a loudspeaker module, in the meanwhile, collecting in real time the operation data of the target rider, where the first riding velocity does not satisfy the preset second threshold interval or the riding gesture data are regular, executing the steps S1 to S4 repeatedly;

A warning module 205, configured to send assistance request data to the preset remote server where the operation data of the target rider have not been collected and sending the assistance request data to riders in the target area via a Mesh network, wherein the assistance request data comprise positional information of the target rider.

By synergic cooperation of the parts, by monitoring changes of the riding velocity and the riding gesture of the rider, whether the rider falls over is judged comprehensively to improve detection accuracy. Before sending the assistance request information, the current rider is informed and the other riders in the team are warned by pronouncing the alarming, and the current rider can automatically cancel broadcasting and warning. By sending the assistance request information in a plurality of ways such as telephone, WiFi and Mesh, riding conditions of the rider can be monitored comprehensively in view of the data from the GNSS and the six-axis inertial measurement unit module, to identify whether the rider tumbles more efficiently and accurately, where tumbling tendency of the rider is observed, warning the current rider timely and informing the other members in the teams, where the warning is not canceled, sending the assistance request information via the telephone, WiFi and Mesh, and in this way, timeliness and accuracy of early warning for tumbling during riding can be enhanced.

The present invention further provides an early warning device for tumbling during riding, wherein the early warning device for tumbling during riding comprises a memory and a processor, wherein computer readable instructions are stored in the memory, the computer readable instructions when being executed by the processor, will have the processor to execute the steps of the early warning method for tumbling during riding set forth in the foregoing embodiments.

Those skilled in the art can readily appreciate that, to ease description, for specific working processes of the foregoing system and units please refer to the processes set forth in the foregoing method embodiments and the details will not be repeated again here.

The integrated units when being implemented in the form of software functional units and sold or used as an independent product, can be stored in a computer readable storage medium. Based on such understanding, in essence the technical solutions of the present invention or portions of the present invention those are creative relative to the prior art or some or all of the technical solutions can be implemented in the form of software products, the computer software products can be stored in a storage medium, and include instructions to have a computer device (can be a personal computer, server or network device etc.) to execute all or some steps of the method embodiments set forth in the description. And the storage medium comprises: U-disk, mobile hard disk, read-only memory, random access memory, magnetic disk or optical disk etc.

The foregoing embodiments are only intended to explain the technical solutions of the present invention rather than limit them; although a detailed description has been given to the present invention with reference to the foregoing embodiments, those of ordinary skill in the art shall appreciate that, it is still possible to modify the technical solutions recorded in the foregoing embodiments or to replace some technical features with equivalents thereof; and such modification or replacement does not deviate the essence of the present invention from the spirit and range of the technical solutions of the embodiments of the present invention.

What is claimed is:

1. An early warning method for tumbling during riding, wherein the early warning method for tumbling during riding comprises: S1: conducting riding monitoring to a target rider at a preset frequency via a GNSS positioning module, and obtaining a first riding velocity, meanwhile, conducting riding monitoring to the target rider at the preset frequency via a six-axis inertial measurement unit module, and obtaining a second riding velocity and acceleration data;

S2: monitoring in real time a communication status of the GNSS positioning module, where the communication status of the GNSS positioning module is regular, monitoring in real time the first riding velocity;

S3: analyzing the acceleration data, extracting the acceleration data corresponding to the first riding velocity, and where the acceleration data satisfy an interval of a first threshold, executing step S4; where the acceleration data do not satisfy the interval of the first threshold, executing repeatedly steps S1 to S3;

S4: giving threshold analysis for the first riding velocity in a preset time interval, meanwhile, giving riding gesture analysis to the target rider and obtaining riding gesture information, where the first riding velocity satisfy an interval of a second threshold, and the riding gesture data show irregular riding gestures, pronouncing a warning to the target rider, meanwhile, collecting in real time operation data of the target rider, where the first riding velocity does not satisfy the interval of the second threshold, or the riding gesture data are regular, executing steps S1 to S4 repeatedly; and S5: where the operation data of the target rider are not collected, sending assistance request data to a preset remote server, and sending the assistance request data to a plurality of riders in a target area via a Mesh network, wherein the assistance request data comprise positional information of the target rider.

2. The early warning method for tumbling during riding according to claim 1, wherein the method further comprises:
where the communication status of the GNSS positioning module is irregular, monitoring in real time the second riding velocity;
analyzing the acceleration data, where the acceleration data satisfy the interval of the first threshold, executing the step S4, where the acceleration data do not satisfy the interval of the first threshold, repeatedly executing the steps S1 to S3;
giving threshold analysis to the second riding velocity in the preset time interval, meanwhile, giving riding gesture analysis to the target rider, and obtaining the riding gesture data, where the second riding velocity satisfies the interval of the preset second threshold, and the riding gesture data show an irregular riding gesture, pronouncing a warning to the target rider via a loudspeaker module, meanwhile, collecting in real time the operation data of the target rider, where the first riding velocity does not satisfy the interval of the preset second threshold or the riding gesture data are regular, executing repeatedly the steps S1 to S4;
where the operation data of the target rider are not collected, sending assistance request data to the preset remote server, wherein the assistance request information comprises the positional information of the target rider and pronouncing the assistance request data to the plurality of riders in the target area via the preset Mesh network.

3. The early warning method for tumbling during riding according to claim 2, wherein the step S4 comprises:
giving threshold analysis to the first riding velocity in the preset time interval, meanwhile, giving riding gesture analysis to the target rider, and obtaining the riding gesture data, where the first riding velocity satisfies the interval of the preset second interval, extracting forward inclination angle data, backward inclination angle data and left or right inclination angle data of the target rider collected by the six-axis inertial measurement unit module;
giving riding gesture analysis to the target rider according to the forward inclination angle data, the backward inclination angle data and the left or right inclination angle data, and obtaining the riding gesture data, where the riding gesture data show the irregular riding gesture, pronouncing a warning to the target rider via the loudspeaker module, meanwhile, collecting in real time the operation data of the target rider, where the first riding velocity does not satisfy the interval of the preset second threshold or the riding gesture data are regular, executing the steps S1 to S4 repeatedly.

4. The early warning method for tumbling during riding according to claim 3, wherein giving riding gesture analysis to the target rider according to the forward inclination angle data, the backward inclination angle data and the left or right inclination angle data and obtaining the riding gesture data comprises:
analyzing the left or right inclination angle data, the backward inclination angle data and the forward inclination angle data, judging the riding gesture data show irregular riding gestures, comprises: the left or right inclination angle data exceed a first preset angle threshold, the forward inclination angle data exceed a second preset angle threshold, and/or the backward inclination angle data exceed a third preset angle threshold.

5. The early warning method for tumbling during riding according to claim 1, wherein the method further comprises:
where the riding gesture data show the regular riding gesture and the first riding velocity satisfies the interval of the preset second threshold, executing the steps S1 to S4 repeatedly.

6. The early warning method for tumbling during riding according to claim 1, wherein the method further comprises:
Upon collecting of the operation data of the target rider, executing the steps S1 to S5 repeatedly.

7. The early warning method for tumbling during riding according to claim 1, wherein the step S5 further comprising:
where the operation data of the target rider are not collected, sending assistance request data to the preset remote server, wherein sending the assistance request data to the preset remote server is done in a following manner:
connecting directly with the remote server via a preset WiFi module by a WiFi hotspot, and sending the assistance request data to the remote server, or
connecting with a mobile application on a telephone via a preset Bluetooth module, and connecting with the remote server via the mobile application and sending the assistance request data to the remote server, wherein the assistance request data comprise the positional information of the target rider and pronouncing the assistance request data to the plurality of riders in the target area via the preset Mesh network.

8. An early warning apparatus for tumbling during riding, the early warning apparatus for tumbling during riding comprises:
an acquisition module, configured to monitor a target rider during riding at a preset frequency via a GNSS positioning module, and obtaining a first riding velocity, meanwhile, monitoring the target rider at the preset frequency during riding via a six-axis inertial measurement unit module and obtaining a second riding velocity and acceleration data;

a monitoring module, configured to monitor a communication status of the GNSS positioning module, and monitoring in real time the first riding velocity where the communication status of the GNSS positioning module is regular;

a computation module, configured to analyze the acceleration data, where the acceleration data satisfy an interval of a preset first threshold, executing the step S4, where the acceleration data do not satisfy the interval of the preset first threshold, executing the steps S1 to S3 repeatedly;

a broadcasting module, configured to give threshold analysis to the first riding velocity in a preset time interval, meanwhile, giving riding gesture analysis to the target rider, and obtaining the riding gesture data, where the first riding velocity satisfies an interval of a preset second threshold, pronouncing a warning to the target rider via a loudspeaker module, meanwhile, collecting in real time operation data of the target rider, where the first riding velocity does not satisfy the preset second threshold interval, or the riding gesture data are regular, executing the steps S1 to S4 repeatedly; and an early warning module, configured to send assistance request data to a preset remote server where the operation data of the target rider are not collected, and send the assistance request data to a plurality of riders in a target area via a Mesh network, wherein the assistance request data comprise positional information of the target rider.

9. An early warning device for tumbling during riding, comprising a memory and at least one processor, instructions are stored in the memory; the at least one processor calls the instructions in the memory to have the early warning device for tumbling during riding to execute the early warning method for tumbling during riding according to claim 1.

* * * * *